United States Patent [19]

Watson

[11] Patent Number: 5,058,928

[45] Date of Patent: Oct. 22, 1991

[54] AUXILIARY DEVICE FOR A PNEUMATIC QUICK-RELEASE COUPLING

[75] Inventor: Richard W. Watson, Lakeside, Calif.

[73] Assignee: Richard Wayne Watson, Lakeside, Calif.

[21] Appl. No.: 687,612

[22] Filed: Apr. 19, 1991

Related U.S. Application Data

[63] Continuation-in-part of Ser. No. 528,369, May 25, 1990, abandoned.

[51] Int. Cl.$^5$ .............................................. F16L 37/02
[52] U.S. Cl. ...................................... 285/38; 285/93; 285/315
[58] Field of Search .................. 285/38, 93, 259, 291, 285/315, 316, 423; 403/17, 18; 251/293, 149.1, 149.6; 137/614.04

[56] References Cited

U.S. PATENT DOCUMENTS 2,565,572  8/1951  Pangborn .................... 285/316 X
4,007,909  2/1977  Buseth et al. ................ 285/316 X Primary Examiner—Dave W. Arola
Assistant Examiner—Heather Chun

[57] ABSTRACT

The auxiliary device is in the form of a disk-shaped body having a front face, a rear face and lateral side wall surfaces. A cylindrical bore hole extends through the body from its front face to its rear face and it has a diameter that is slightly smaller than the outer diameter of the retractable spring-loaded sleeve of an air hose quick-disconnect coupling so that the auxiliary device may be manually slid on over the tubular sleeve and frictionally held thereto. The diameter of the front face of the disk-shaped body is sufficiently large enough that the hand of the person connecting or disconnecting the end of an air hose to the coupling can push his hand against the front face to move the spring loaded sleeve rearwardly while engaging or disengaging the end of the air hose.

2 Claims, 1 Drawing Sheet

AUXILIARY DEVICE FOR A PNEUMATIC QUICK-RELEASE COUPLING

CONTINUING DATA

This application is a continuation-in-part of Ser. No. 07/528,369, filed 5/25/90, now abandoned.

BACKGROUND OF THE INVENTION

The invention relates to pneumatic air hose couplings and more specifically to conventional quick-release disconnect couplings having a retractable spring-loaded sleeve.

Presently, in order to connect or disconnect the end of an air hose from the coupling, it is necessary for a worker to grip the retractable spring-loaded sleeve with his left hand and force it rearwardly while holding the end of the air hose in his right hand and pushing that end into the open end of the coupling. Quite often this act is accomplished while wearing gloves which makes it more difficult to grasp the retractable spring-loaded sleeve. Also in many instances the quick-disconnect coupling only extends outwardly approximately 1½ inches from a wall mounting position and that increases the difficulty in grasping the spring-loaded sleeve. It is extremely difficult for a worker to attempt to connect or disconnect the end of the air hose from the coupling using only one hand.

Some of the places where the air hose quick-disconnect couplings are found are in auto shops and industrial work areas. Any area where compressed air is used by tools or machinery will generally have such a quick-disconnect coupling. Often the compressed air is plumbed around a shop or yard to provide multiple locations where a pneumatic power tool can be connected.

It is an object of the invention to provide an novel auxiliary device that can be detachably mounted on the reciprocating tubular sleeve of a conventional quick-release coupling for an air hose to provide a leverage surface against which the workers hand may be pushed in order to move rearwardly the retractable spring-loaded sleeve for connecting and disconnecting an air hose.

It is also an object of the invention to provide a novel auxiliary device that can be manually mounted on the reciprocating tubular sleeve of a conventional quick-release coupling for an air hose.

It is another object of the invention to provide an auxiliary device that is made of a bright material that causes it to be easily identified on the reciprocating tubular sleeve of a conventional quick-release coupling for an air hose.

It is another object of the invention to provide an auxiliary device for a conventional quick-release coupling for an air hose that is economical to manufacture and market.

SUMMARY OF THE INVENTION

The auxiliary device has a disk-shaped body having a front face, a rear face and lateral side wall surfaces. A cylindrical bore hole extends through the body from its front face to its rear face and it has a diameter that is slightly smaller than the outer diameter of the retractable spring-loaded sleeve of the quick-disconnect coupling. This allows it to be manually slid on over the tubular sleeve and frictionally held thereto.

The front face of the disk-shaped body has a sufficiently large enough diameter that a person's hand can be pressed against it to provide leverage for pushing the retractable spring-loaded sleeve rearwardly during the connecting or disconnecting operation. No finger gripping power is required by the person which is advantageous to older people or people having limited gripping strength in their fingers. The disk-shaped body is preferrably molded as an integral one piece member from a plastic material such as polyurethane. It would also preferably be made of a material having a bright color such as red that makes its location easily recognizable by a worker.

The disk-shaped body is frictionally fit over the retractable spring-loaded sleeve so that its front face is substantially positioned adjacent the front end of the spring-loaded sleeve. The front face then functions as a shoulder against which a workers hand may be pressed. This allows the worker to connect or disconnect an air hose to the quick-disconnect coupling using one hand and leaving his other hand free to carry a pneumatic power tool. The connection and disconnection is a simple operation and it saves time and is more efficient since only one hand is necessary to accomplish the task.

The shape of the disk-shaped body is preferably frusto-conical. The lateral side wall surfaces converge inwardly to provide a gripping surface for the workers fingers when it is necessary to pull the retractable spring-loaded sleeve forwardly due to a malfunction in the operation of the spring itself.

Prior art disk-shaped bodies that have been slipped on quick-release disconnect couplings have not had a front face whose dimension was great enough to provide a gripping surface for a person's fingers. Due to the fact that the couplings have a rather small diameter, it is necessary for the front face of the disk-shaped body to have a front face whose outer diameter is at least 50% greater than its axial length. It is also important for the front face of the disk-shaped body to be a solid planar surface not having any recesses or grooves that can collect dirt and grease and make it slippery to grip. It is also important to have the outer edges of the front face rounded on its entire periphery to prevent a person's fingers from being cut on sharp outer edges of the disk-shaped body. The longitudinal cross-section of said disk-shaped body being in the form of a trapezoid, with its lateral wall and front face forming an intersection at an acute angle and the intersection surface is rounded.

Figure 1:
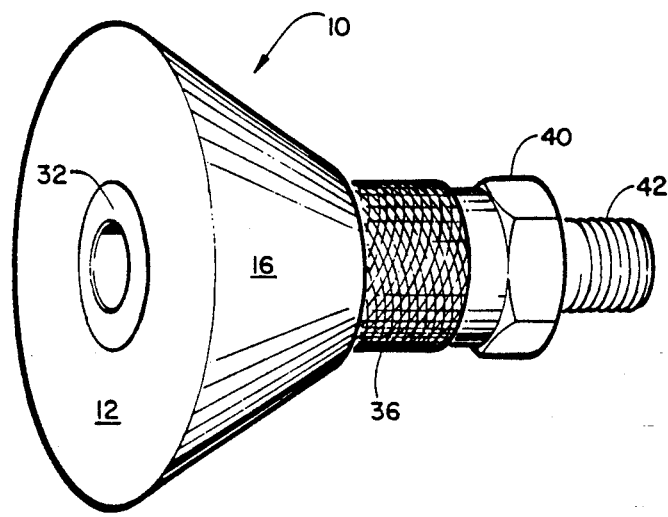
FIG. 1 is a front perspective view of the auxiliary device mounted on a conventional air hose quick-disconnect coupling.
Figure 4:
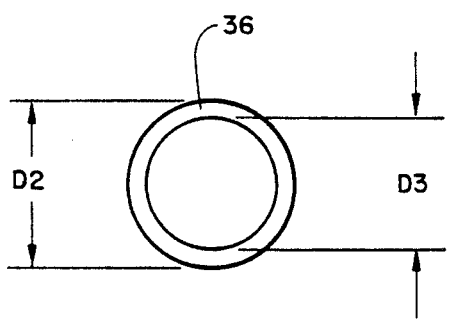
FIG. 4 is a front elevation view of the retractable spring-loaded sleeve of the air hose quick-disconnect coupling.
Figure 3:
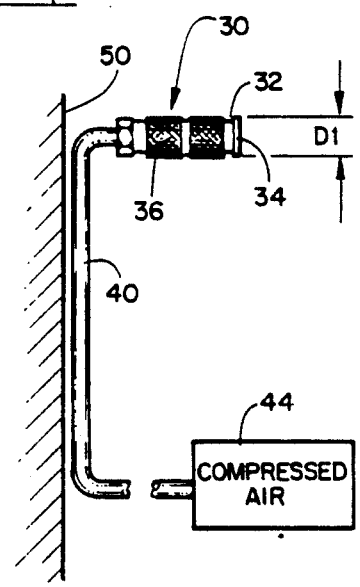
FIG. 3 is a side elevation view showing the air hose quick-disconnect coupling mounted so that it extends out from a wall surface.

The drawings are drawn to scale.

DESCRIPTION OF THE PREFERRED EMBODIMENT

Applicant's novel auxiliary device for an air hose quick-disconnect coupling will now be described by referring to FIGS. 1–4. The auxiliary device is generally designated numeral 10. It has a front face 12, a rear wall 14, and lateral side wall surfaces 16. The disk-shaped body 18 has a generally frusto-conical configuration. A bore hole 20 extends from front face 12 through to rear wall 14 and it has a diameter D4. The outer diameter of front face 12 is D5.

The air hose quick-disconnect coupling 30 has a cylindrical body 32 having a flange 34 formed on its front end. A retractable spring-loaded sleeve 36 has an outer diameter D2 and an inner diameter D3. Flange 34 has an outer diameter D1 which is slightly smaller than the outer diameter D2 of retractable spring-loaded sleeve 36. A hexagonal wrench gripping surface 40 is formed on cylindrical body 32 adjacent its rear end and its extreme rear end has external threads 42. Air hose quick-disconnect coupling 30 is removably threaded into tubing 41 that is connected to a source of compressed air 44. The air hose quick-disconnect coupling extends outwardly from wall surface 50.

Figure 2:
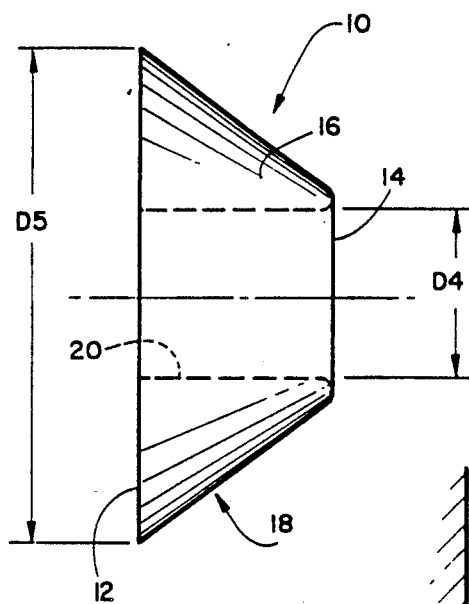
FIG. 2 is a side elevation view of the auxiliary device.
Figure 2B:
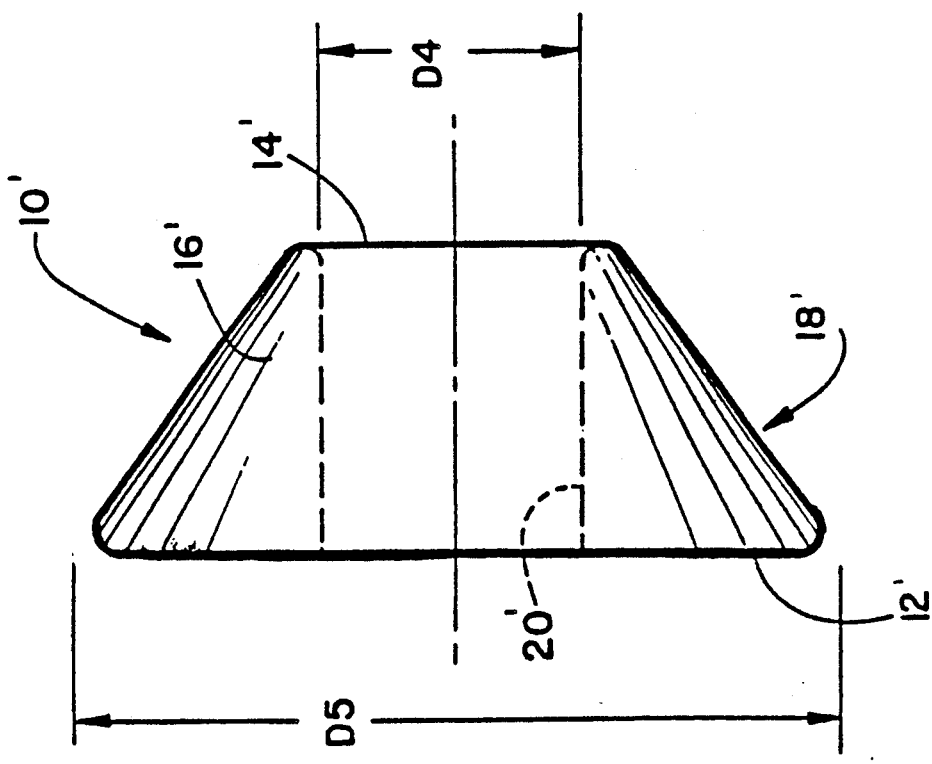
FIG. 2B is a side elevation view of a modified version of the auxiliary device.

In FIG. 2B the modified version of the auxiliary device is illustrated and it is designated numeral 10'. It has a front face 12' having rounded edges around its periphery. It also has a rear wall 14', lateral side wall surfaces 16' and a bore hole 20'.

What is claimed is:

1. The combination of a quick-disconnect coupling for an air hose and an auxiliary device detachably mounted thereon for providing assistance when connecting and disconnecting the end of an air hose comprising:

a conventional quick-disconnect coupling having an elongated cylindrical body having a front end and a rear end, said front end having a radially extending flange having an outer diameter D1, said rear end having externally threaded grooves, a tubular sleeve mounted on said cylindrical body intermediate its ends for connecting and disconnecting the end of the air hose from the coupling, said tubular sleeve having an outer diameter D2 and an inner diameter D3 so that said tubular sleeve can travel axially back and forth over said cylindrical body; and said auxiliary device consisting of a disk-shaped body consisting of a front face, a rear face and lateral side wall surfaces, said auxiliary device having a frusto-conical shape with the diameter D5 of its front face being at least twice as large as the diameter of its rear face, the diameter D5 of said front face being at least 50% greater than the axial length of said auxiliary device, a cylindrical bore hole extends through said body from its front face to its rear face and it has a substantially constant diameter D4 that is slightly smaller than D2, said auxiliary device being manually slid on over the tubular sleeve of said quick-disconnect coupling and being held on only by friction, said auxiliary device being made of plastic material, the longitudinal cross-section of said disk-shaped body being in the form of a trapezoid, said lateral wall and said front face forming an intersection at an acute angle, said intersection being rounded, said front face being planar and formed of solid material extending from its outer rounded edges to its cylindrical bore hole.

2. The combination as recited in claim 1 wherein said plastic material is polyurethane.

* * * * *